United States Patent [19]

Piotrowski et al.

[11] Patent Number: 4,520,413
[45] Date of Patent: May 28, 1985

[54] INTEGRATED MAGNETOSTRICTIVE-PIEZOELECTRIC-METAL OXIDE SEMICONDUCTOR MAGNETIC PLAYBACK HEAD

[75] Inventors: Chester Piotrowski, White Bear Lake; Steven A. Bendson, Edina; Neil W. Loeding, Mounds View; William M. Mularie, Grant Township, Washington County, all of Minn.

[73] Assignee: Minnesota Mining and Manufacturing Company, St. Paul, Minn.

[21] Appl. No.: 368,025

[22] Filed: Apr. 13, 1982

[51] Int. Cl.³ .......................... G11B 5/12; G11B 5/30
[52] U.S. Cl. ...................................... 360/113; 365/157
[58] Field of Search ..................... 360/113; 365/7, 157

[56] References Cited

U.S. PATENT DOCUMENTS

| | | | |
|---|---|---|---|
| 2,683,856 | 7/1954 | Kornei | 322/2 |
| 3,344,237 | 9/1967 | Gregg | |
| 3,389,230 | 6/1968 | Hudson, Jr. | 179/100.2 |
| 3,553,540 | 1/1971 | Puterbaugh, Jr. | 317/235 |
| 3,800,193 | 3/1974 | Ashar et al. | 317/235 R |
| 3,908,194 | 9/1975 | Romankiv | |
| 3,909,809 | 9/1975 | Kinsner et al. | |
| 3,987,485 | 10/1976 | Sugaya et al. | |
| 4,048,648 | 9/1977 | Vinal | 357/27 |
| 4,129,880 | 12/1978 | Vinal | |
| 4,210,946 | 7/1980 | Iwasaki et al. | |
| 4,275,428 | 6/1981 | Lehureau | |

FOREIGN PATENT DOCUMENTS

| | | |
|---|---|---|
| 3002783 | 7/1981 | Fed. Rep. of Germany . |
| 2321169 | 3/1977 | France . |

OTHER PUBLICATIONS

Brunsch et al., IBM Tech. Discl. Bull., vol. 21, No. 2, Jul. '78, pp. 667–668; "Magnetic Read/Write Thin Film Head with Variable Adjustable Anisotropy".
Bracke et al., Int. J. Elect. 1981, vol. 51, No. 3, 255–262; "A Broadband Magneto-Electric Transducer using a Composite Material".
Patents Abstracts of Japan, vol. 1, No. 148, Nov. 29, 1977, p. 7660, E 77 & JP-A-52 88317 (Nippon Kenki K.K.), 07-23-1977.
IBM Technical Disclosure Bulletin, vol. 8, No. 3, Aug. 1965, pp. 359–360, Armonk, New York, USA, A. T. Germano et al., "Transducer Head Assembly Including Modified Field Effect Coupling".
IBM Technical Disclosure Bulletin, vol. 16, No. 8, Jan. 1974, pp. 2491–2492, Armonk, New York, USA, F. F. Fang et al., "Piezoresistive Bubble Domain Detector".
IBM Technical Disclosure Bulletin, vol. 17, No. 11, Apr. 1975, pp. 3478–3480, Armonk, New York, USA, R. Anderson et al., "Balanced Resistance Magnetoresistive Head Compensated Against Thermal and Piezoresistive Effects".
IBM Technical Disclosure Bulletin, vol. 18, No. 1, Jun. 1975, p. 24, Armonk, New York, USA, S. H. Smith, "Magnetoresistive Magnetic Head".
IBM Technical Disclosure Bulletin, vol. 17, No. 7, Dec. 1974, p. 1862, Armonk, New York, USA, S. D. Cheatham et al., "Self-Biased, Noise-Free Magnetoresistive Head".

Primary Examiner—A. J. Heinz
Attorney, Agent, or Firm—Donald M. Sell; James A. Smith; William B. Barte

[57] ABSTRACT

A thin-film magnetic recording playback head is disclosed wherein mechanically coupled films of a magnetostrictive material and of a piezoelectric material are deposited on a substrate with a solid state amplifier which is coupled to the piezoelectric film. In operation, localized magnetic patterns on a recording medium induce stress in the magnetostrictive film, which in turn induces in the piezoelectric film a corresponding electrical polarization of non-equilibrium charge density, having a potential associated therewith which is applied to the solid state amplifier.

16 Claims, 17 Drawing Figures

INTEGRATED MAGNETOSTRICTIVE-PIEZOELECTRIC-METAL OXIDE SEMICONDUCTOR MAGNETIC PLAYBACK HEAD

FIELD OF THE INVENTION

This invention relates to thin-film magnetic recording playback heads, particularly to such heads wherein non-inductive means are utilized for sensing localized magnetic field patterns of a magnetic recording medium.

DESCRIPTION OF THE PRIOR ART

With an apparently never-ending quest to increase the storage density on magnetic recording medium has come increased demands not only on the magnetic recording medium per se, but also on the transducers used for both recording and playing back the recorded information. As the recorded bit size has progressively decreased, the recording and playback head gaps in typical ring shaped heads have also decreased until it is now virtually impossible to reduce them further using discrete spacer layers. There has consequently been developed a new class of recording and playback heads utilizing thin-films, in which high permeability materials are formed as thin-film pole pieces, metallic thin-films are formed to provide inductive windings around the thin-film pole pieces, and insulative thin-films are formed to provide both a gap between the pole pieces and to insulate the respective windings where appropriate.

Such thin-film heads were perhaps first disclosed in U.S. Pat. No. 3,344,237 assigned to Minnesota Mining and Manufacturing Company, the assignee of the present invention. Since that initial development, many types of thin-film heads have been developed in various attempts to improve the reliability and signal-to-noise ratio while reducing manufacturing costs, complexity, and the like. Particularly relevant to the present invention are non-inductive thin-film playback heads, such as those utilizing magnetoresistive films. U.S. Pat. No. 3,987,485 (Sugaya et al) is exemplary of prior art disclosing such heads, the device there disclosed includes a semiconductive substrate on which may be deposited, along with the magnetoresistive film, or films for multi-track heads, integrated circuits such as switching circuits and amplifiers which are connected to the magnetic heads. In a somewhat similar fashion, U.S. Pat. No. 3,908,194 (Romankiw) depicts a thin-film magnetoresistive read head integrated with a thin-film inductive write head.

In addition to such magnetoresistive thin-film heads, it is also known to utilize heads including thin-films having magnetostrictive properties. Thus, for example, Brunsch et al, IBM Tech. Disclosure Bulletin, Vol. 21, No. 2, July 1978, pp. 667--668, depicts a thin-film head, with both read and write capabilities, in which magnetostrictive films having permanent anisotropy surround a single turn inductive winding, forming a working gap therebetween, and are in turn mechanically coupled to a piezoelectric substrate. In the head there depicted, read or write signals appear to be coupled from or to the conductor and hence inductively from or to the gap, while DC or AC voltages are applied to the piezoelectric substrate, causing stress in the magnetostrictive films, which, in turn, rotates the anisotropy to allow the signals to be more readily coupled through the gap. Such a head is thus actually an inductive type device in which magnetostriction is utilized in a secondary manner.

A device in which mechanically coupled magnetostrictive and piezoelectric films are used to directly sense localized fields is depicted in U.S. Pat. No. 3,909,809 (Kinsner et al). The device there set forth is adapted for sensing magnetic bubble domains such as may be present in magnetic bubble memories in which the bubble memory and sensing device are both stationary, i.e. one does not move relative to the other, as is otherwise the case in a magnetic recording medium and associated record or playback head. Further, the device disclosed therein does not incorporate amplifiers or other electronic circuits as an integral part thereof.

DISCLOSURE OF INVENTION

In contrast to thin-film magnetoresistive playback heads and magnetic field sensors such as discussed above, the playback head of the present invention utilizes a substrate having thereon at least one magnetostrictive thin-film mechanically coupled to a piezoelectric thin-film. Localized magnetic field patterns such as may be present in a record track on a magnetic recording medium positioned adjacent the magnetostrictive thin-film may thereby be sensed independently of speed, or changes in the speed, of the head relative to the medium. Strain magnetically-induced in the magnetostrictive thin-film is thereupon coupled to the piezoelectric thin-film to induce therein a corresponding electrical polarization and non-equilibrium charge density on at least one surface of the piezoelectric thin-film.

The head further comprises at least two electrodes, each extending over at least a portion of the piezoelectric thin-film for coupling therefrom an electrical potential corresponding to said charge density. Finally, the head also comprises means for providing a low impedance output signal corresponding to the induced charge density, such as a solid state amplifier included on the substrate, which is coupled to the electrodes for receiving the potential from the electrodes associated with the piezoelectric thin-film.

In a preferred embodiment, the head of the present invention comprises a non-magnetic substrate, and especially a semiconductive substrate having as an integral part thereof a solid-state amplifier. In such an embodiment, particularly where the amplifier is a MOSFET type transistor, it is further desirable that the piezoelectric and magnetostrictive thin-films be fabricated directly onto the gate of the MOSFET transistor, thereby minimizing capacitances associated with the connections between the piezoelectric thin-film and the amplifier.

Desirably, a substrate carrying the magnetostrictive thin-film and piezoelectric thin-film is fabricated together with a carrier member adapted to be mounted with the plane of the thin-films substantially normal to the surface of a magnetic recording medium, thereby enabling localized magnetic patterns on the medium and oriented normal to the surface thereof to be impressed on the length of the magnetostrictive thin-film, thus producing a lengthwise stress which is coupled to the piezoelectric thin-film.

If desired, the mechanically coupled magnetostrictive and piezoelectric thin-films may be positioned proximate to high permeability thin-film pole pieces configured to optimize detection of either vertically or longitudinally oriented magnetic recordings such that magnetic fields coupled to the pole-pieces induce in the magnetostrictive thin-film a mechanical stress which is coupled to the piezoelectric thin-film, etc. as described hereinabove.

Also, in order to minimize interference from non-magnetically strain-induced stimuli, a further embodiment of the present invention includes an additional thin-film of a non-strain sensitive material which has substantially the same area as that of the magnetostrictive thin-film and which extends over a different portion of the piezoelectric thin film. In such embodiments, an output from the piezoelectric thin-film proximate the non-strain-sensitive thin-film is compared with the output from another section of the piezoelectric thin-film proximate the magnetostrictive thin-film such that undesired non-magnetic stimuli, both time varying and steady state, applied to both portions of the piezoelectric thin-film may be suppressed while allowing stimuli present only in one portion, such as that magnetically induced in the magnetostrictive thin-film, to be readily detected.

The playback head of the present invention thus satisfies a need existing for a device for reading high density magnetic information stored in memory systems being developed for applications such as a consumer electronic camera. In summary, the essential features of the head thus include integrated magnetostrictive and piezoelectric (IMP) thin-films which operate in conjunction with an amplifier, preferably of a metal-oxide-semiconductor (MOS) type. The resultant head will commonly be referred to herein as an IMP-MOS device.

DETAILED DESCRIPTION

Figure 1:
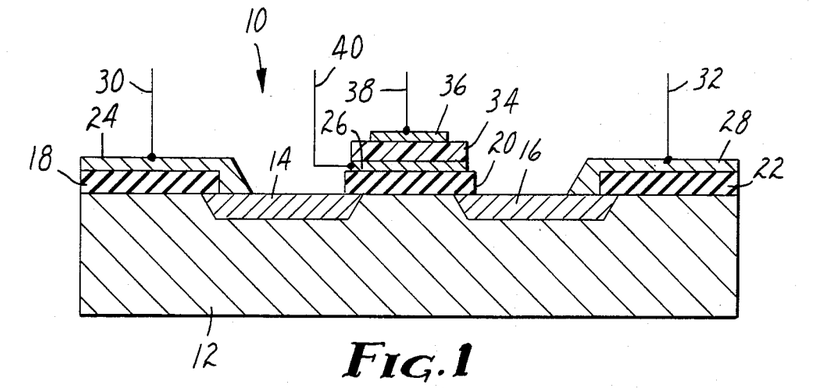
FIG. 1 is a sectional view of a preferred embodiment of an IMP-MOS device according to the present invention wherein adjoining magnetostrictive and piezoelectric films are applied directly to the gate of an N-channel MOSFET transistor.

As set forth herein, the IMP-MOS device of the present invention may be constructed in a variety of configurations including embodiments wherein the magnetostrictive and piezoelectric films are applied on separate substrates from that of the MOSFET device, as well as embodiments wherein the elements are directly coupled together. FIG. 1 sets forth a preferred embodiment of the latter wherein the magnetostrictive and piezoelectric films are deposited directly to the gate of an associated MOSFET transistor. Accordingly, as there shown, the IMP-MOS device 10 includes a substrate 12 of P-type silicon in which two zones have been heavily doped to provide N-type regions 14 and 16, respectively. On top of the substrate and adjoining the N-type regions 14 and 16 are formed insulating $SiO_2$ regions 18, 20, and 22, respectively, and on top thereof are deposited metallic contact regions 24, 26, and 28 respectively, thereby completing a conventional MOSFET transistor. Appropriate potentials may be applied to the device such as via conductors 30, 32 and 40 secured to the metallic contacts 24, 26 and 28, respectively.

The IMP-MOS device of this embodiment is completed by deposition of a piezoelectric film 34 onto the gate contact 26 and by subsequent deposition of a magnetostrictive film 36 onto the piezoelectric film 34.

Electrical potentials may be applied to the magnetostrictive film via lead 38 and to the underlying gate electrode 26 via lead 40.

In order to better understand the operation of the present invention, a short description of the operation of a convention MOSFET device will be useful. When a potential of suitable magnitude and polarity is applied to the lead 40, a conductive channel is formed between the two N-type regions 14 and 16. Application of a voltage between electrodes 30 and 32 results in a current flow between these two electrodes; the magnitude of which is determined by the polarity and magnitude of the potential applied to the lead 40. In the present invention, the magnetic field is detected and transduced into an electrical signal, resulting in a modulated potential on the gate electrode 26 in the following manner: A magnetic field applied in the plane of the magnetostrictive element 36 produces a fractional length change in this element. As the magnetostrictive film is tightly coupled to the piezoelectric film 34, this constriction will produce a corresponding strain or length change in the piezoelectric film 34. This strain in turn results in a voltage on the gate electrode 26 of the MOS transistor and this modulation of the gate voltage of the transistor results in a change in the electrical current through the leads 30 and 32.

In one example, a device such as that set forth in FIG. 1 was constructed in the following manner. A P-channel enhancement mode MOSFET transistor was fabricated from an N-type silicon substrate utilizing conventional MOSFET technology, wherein the gate electrode was prepared having dimensions of approximately 25 by 1,000 micrometers. A prototype combination of magnetostrictive and piezoelectric films was formed as follows: A film of commercially available 25-micron thick polyvinylidene fluoride (PVF$_2$) was metallized with a thin film of aluminum on both sides and subsequently poled by heating the PVF$_2$ to a temperature in excess of its Curie point and allowing it thereafter to cool while in an electric field. The thus poled film was then mounted via a transfer adhesive to a water cooled rotating substrate in a vacuum chamber of an ion beam deposition system. The PVF$_2$ was then maintained near room temperature through a subsequent deposition operation. A magnetostrictive thin film of approximately 500 nanometers of nickel was subsequently ion beam sputtered onto the PVF$_2$ from a 98%+ pure nickel foil target. After the deposition, the nickel coated PVF$_2$ film was removed and cut into strips approximately 1 by 6 millimeters in cross section. Next, a thin layer of silver conductive epoxy was applied to the side of the PVF$_2$ opposite to that on which the nickel film was deposited. The strip was then glued onto the gate of the MOSFET transistor described above, assuring good electrical contact between the bottom layer of the PVF$_2$ and the metallized gate. The top layer of the PVF$_2$ (that having the nickel film sputtered thereon) served as the outer electrode of the transducer structure and was connected to the substrate ground. The resultant electrical properties of the device discussed herein will be discussed in detail with regard to FIG. 14 hereinafter.

In another example, an alternative construction to that described hereinabove was prepared using a blend of PVF$_2$ and PMMA as the piezoelectric film 34. In such an embodiment, the polymer blend was first cast onto the gate electrode 26 from a solution in a conventional manner. A thin gold layer (not shown) was subsequently sputtered onto the PVF$_2$-PMMA blend to form an outer electrode, primarily to be used for poling purposes. The PVF$_2$-PMMA film was then poled in situ in the manner set forth in U.S. patent application Ser. No. 273,901, which application was filed June 19, 1981, by Dennis Krueger et al and is incorporated herein by reference. For convenience, the MOSFET wafer was then mounted in a conventional integrated circuit chip carrier and wire bonded to bonding pads therein in a conventional manner. A length of 0.75 millimeter wide amorphous Fe$_{80}$B$_{20}$ magnetostrictive ribbon was then glued over the gold film on the PVF$_2$-PMMA layer with a rigid epoxy so as to provide good strain coupling. The biasing and testing of such a device is described in more detail hereinafter in conjunction with FIG. 15.

Figure 2:
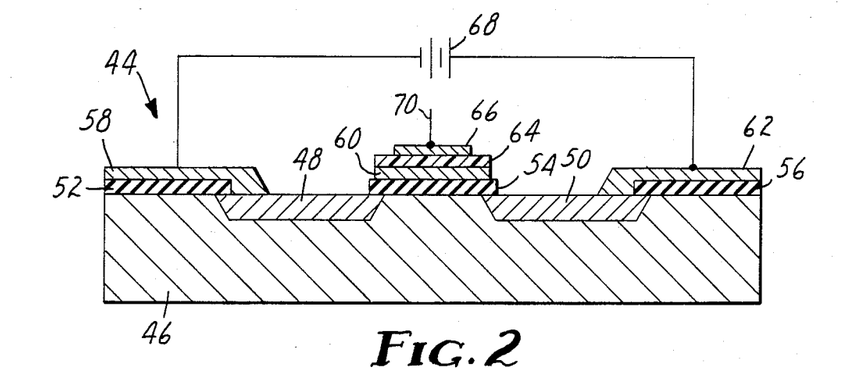
FIG. 2 is a cross-sectional view of a similar integrated assembly of magnetostrictive and piezoelectric films applied directly to the gate of a P-channel type MOSFET field effect transistor, further showing the manner in which an external potential would be coupled between the source and drain contacts of the MOSFET.

Equivalent devices to that shown in FIG. 1 may be made using either N-channel or P-channel silicon substrates, operating in either an enhancement or depletion mode. One such alternative construction is shown in FIG. 2, wherein a P-channel device is shown to be formed utilizing a substrate of N-type silicon. Such a device 44 includes a substrate 46 of N-type silicon having two P-type zones 48 and 50, and has associated therewith insulating regions 52, 54, and 56, which, in turn, are covered with metallic contact regions 58, 60, and 62. The metal contact region 60 thus provides an appropriate gate electrode. On top of the gate electrode 60 is deposited a piezoelectric film 64 and a magnetostrictive film 66. If the device set forth in FIG. 2 is operated in a depletion mode, no further biasing of the gate electrode 60 is necessary, and appropriate potentials need only be applied to the source and drain electrodes 58 and 62 via potential source 68. If desired, appropriate potentials may be applied to the piezoelectric layer for poling via lead 70 secured to the magnetostrictive layer 66. The functioning of a device such as set forth in FIG. 2 is substantially the same as that described in conjunction with FIG. 1 hereinabove.

In another embodiment of the present invention, an IMP-MOS device functionally equivalent to that described in conjunction with FIGS. 1 and 2 hereinabove may be constructed together with suitable high permeability pole pieces to enable remote sensing of localized magnetic fields such as may be present in magnetic recording media. One such device is set forth in plane view in FIG. 3A and associatedly in cross-sectional view in FIG. 3B. As there set forth, the device 72 includes a silicon substrate 74 overlaid with an insulator layer 110 onto which is deposited a metal electrode 76. Overlying the metal electrode 76 is a thin-film of piezoelectric material 78, and overlying the piezoelectric layer a thin-film of a magnetostrictive material 80. Finally, overlying the thus deposited films and bridging the magnetostrictive film 80 are two high permeability thin-film pole pieces 82 and 84, respectively. The magnetostrictive-piezoelectric films are thus formed within the gap of the pole pieces 82 and 84. When a perpendicularly recorded bit, such as indicated by legend 86, within a magnetic recording layer 88 and an associated high-permeability underlayer 90, such as would be provided with vertically oriented magnetic recording medium 93, passes under the high permeability leg 82, the flux therefrom is concentrated and channelled up to the gap between the pole pieces 82 and 84. A substantial proportion of the flux will then bridge through the magnetostrictive film across the gap, the flux loop closing back onto the bit through the large area pole piece 84, and through the high permeability underlayer. The pole piece 84 is desirably made sufficiently extensive in area to result in a sufficiently low flux density to avoid magnetically affecting recorded data passing adjacent the pole piece 84. The flux thus induced in the magnetostrictive film 80 will produce an associated electrical output from the piezoelectric film in the manner described in conjunction with FIGS. 1 and 2 hereinabove. In the embodiment set forth in FIG. 3A, a conventional MOSFET 92 is separately fabricated and bonded to the silicon substrate 74 as there shown. The ground electrode 94 may then be coupled to the underlying electrode 76 via lead 96. Similarly, the contact from the magnetostrictive layer 80 may be made to the gate electrode 98 via lead 100. Finally, appropriate contacts to the source and drain electrodes 102 and 104, respectively, may be made via leads 106 and 108.

Figure 3A:
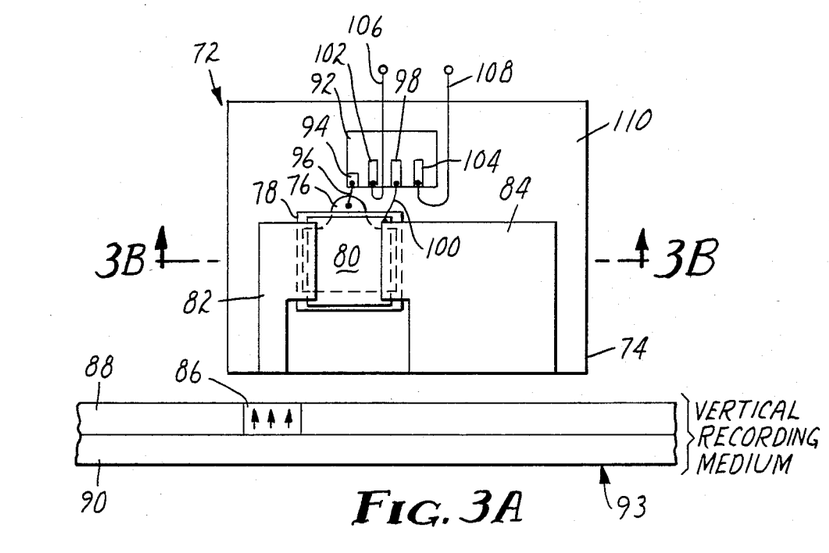
FIG. 3A is a plane view of a further embodiment wherein an IMP-MOS device of the present invention is utilized together with asymmetric pole pieces to provide a playback head suitable for reproduction of vertical recording.
Figure 3B:
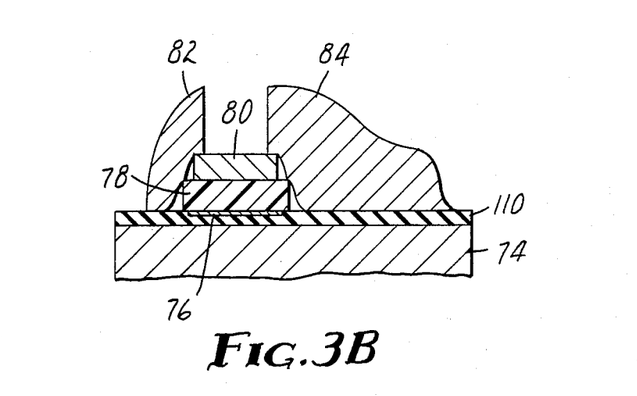
FIG. 3B is a cross-sectional view taken along the lines 3B showing the relationships among the various layers making up the integrated device.

As shown in more detail in the cross-sectional view of FIG. 3B, such a device includes the substrate 74 and an insulating layer 110 thereover to prevent shorting out of the electrodes surrounding the piezoelectric layer 78. Thus, on top of the insulating layer 110 is the metal electrode 76, the piezoelectric film 78 and the magnetostrictive film 80, respectively. The high permeability thin-film pole pieces 82 and 84 are similarly shown deposited over the magnetostrictive film, leaving the gap region therebetween.

Figure 4:
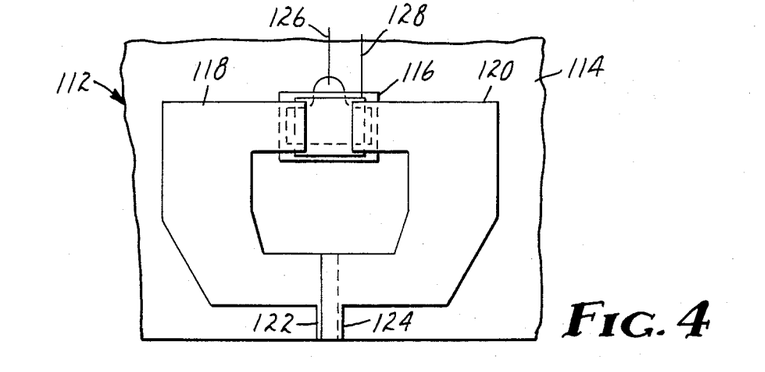
FIG. 4 is a plane view of a further embodiment of the present invention wherein an IMP-MOS device is utilized together with pole pieces to provide a ring type playback head suitable for playback of either vertical or longitudinal recordings.

An alternative construction providing the capability to read both longitudinally and perpendicularly recorded data is shown in FIG. 4. As there shown, the device 112 includes a silicon substrate 114 onto which is deposited a magnetostrictive-piezoelectric transducer element 116, substantially the same as that shown in detail in FIGS. 3A and 3B. However, unlike that of FIGS. 3A and 3B, symmetric, thin-film pole pieces 118 and 120 are deposited thereover, one pole piece terminating with an underlying pole tip 122 which is substantially covered by a second pole tip 124, the two pole tips being separated by an insulative thin-film (not shown), and which thus form the working gap of the resultant head. The construction of such thin-film heads are well known to those skilled in thin-film recording and playback head technology. Leads from the transducer 116 may then be coupled via leads 126 and 128 to a MOSFET (not shown) in the same manner as set forth as in FIG. 3A.

Figure 5A:
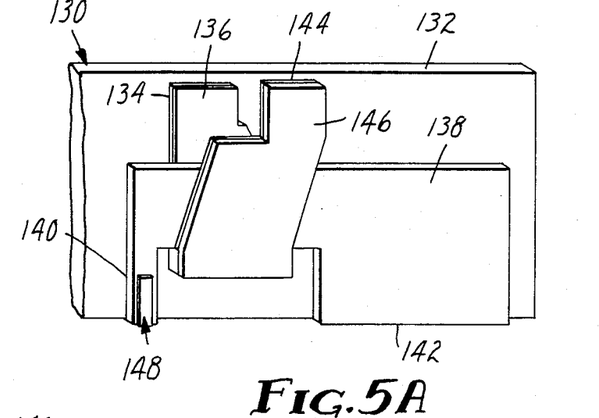
FIG. 5A is a plane view of a further embodiment of the present invention wherein an IMP-MOS device of the present invention is used together with asymmetric pole pieces as shown in FIG. 3A, and wherein a single-turn inductive write head is further included to provide both write and read capabilities.

In an embodiment similar in many respects to that set forth in FIGS. 3 and 4, another embodiment of the present invention may be utilized with external pole pieces to provide both a read and write capability. As set forth in FIG. 5A, such a device 130 may include a silicon substrate 132 on which are deposited successive thin-films so as to form a single turn inductive winding around appropriate pole pieces, similar to those set forth in FIG. 3A and 3B, together with a magnetostrictive-piezoelectric transducer assembly. Thus, using appropriately configured masks, there may first be deposited upon the substrate 132, one-half of an inductive winding 134 in the form of a thin-film of a highly conductive material such as aluminum, copper or silver. On top of the half winding 134 may then be deposited an insulating film 136, which film is substantially the same configuration as that of half of the winding 134, except that it is terminated to allow the winding half to be exposed along its lower portion. A thin-film of a high permeability material may next be deposited as layer 138, thereby forming a concentrated pole piece 140 and a distributed pole piece 142, the insulating film 136 preventing the major portion of the winding half from shorting out to the high permeability layer 138. On top the high permeability layer 138 is then deposited the second half of the inductive single turn winding comprising an insulating film 144 and a conductive film 146. As in the case of the insulating film 136, the second insulating film 144 is likewise terminated along the lower portion to allow the conductive film 146 to directly contact the first winding half 134, thereby completing a single turn around the high permeability film 138.

Figures 5B, 6:
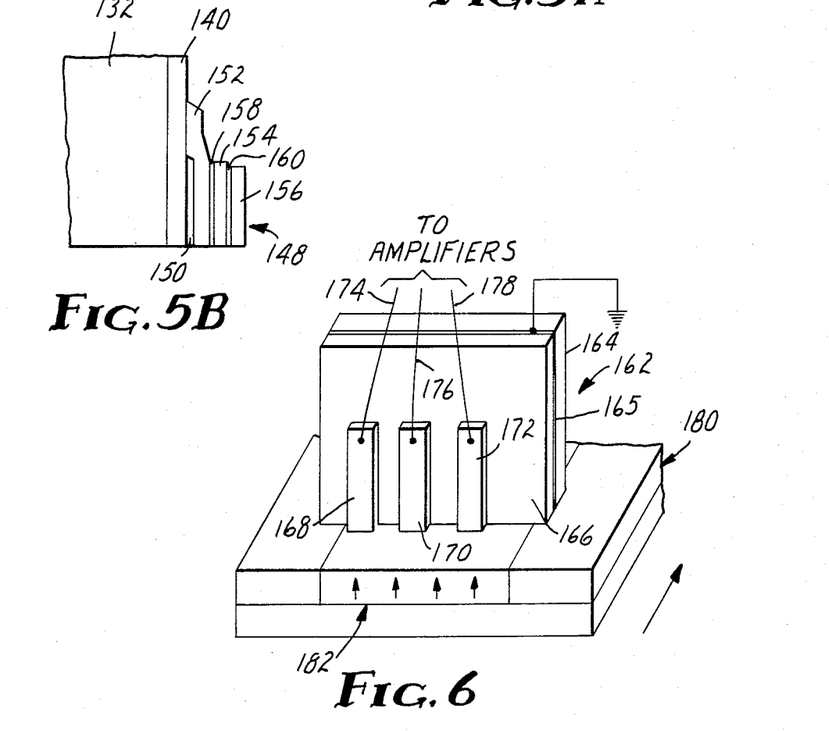
FIG. 5B is a cross-sectional view of the respective layers included within the IMP-MOS structure shown in FIG. 5A.
FIG. 6 is a perspective view of a further embodiment of the present invention wherein a plurality of magnetostrictive-piezoelectric sensing elements are used in combination to provide a multi-channel playback head.

To such a conventional thin-film write head, such as is particularly adapted for recording onto perpendicularly oriented magnetic recording media, may then be deposited appropriate films to provide a magnetostrictive-piezoelectric transducer 148, which transducer is shown in more detail in FIG. 5B. Again, using appropriate masks, there may be first deposited upon the pole tip 140 a thin insulating film 150, thereby spacing subsequent layers from the pole tip 140, and providing an effective magnetic working gap. On top of the spacer 150 may be deposited a thin-film of magnetostrictive material 152, which surrounds the spacer layer 150 and extends into direct contact with the pole tip 140 so as to complete a magnetic circuit therewith. A piezoelectric film 154 may next be deposited onto the magnetostrictive film 152, and an appropriate metallic contact layer 156 applied thereover. Depending upon the conductivity of the material selected for use as the piezoelectric film, it may further be desirable to provide additional insulating layers between the respective electrode layers and the piezoelectric film such as thin-films 158 and 160, respectively, so as to avoid undesirable leakage currents.

Such a configured head may thus be utilized in a write mode by applying suitable currents to the inductive winding formed by the conductive films 134 and 146 to induce an appropriate magnetic field in the core 138, therby providing a concentrated field within the pole piece 140 to induce localized magnetic fields within a magnetic recording medium positioned therebelow. In a playback mode, such localized fields will cause a strain to be induced within the magnetostrictive layer 152, a flux return path for such fields thereupon being provided via the pole piece 140. The stress induced within the magnetostrictive film 152 is coupled to the piezoelectric film 154 to cause the production of localized electric charges and associated potentials which are coupled to an associated amplifier (not shown) as discussed hereinabove.

An alternative embodiment similar to that shown in FIG. 5B may be constructed utilizing a magnetic material as the underlying substrate, such as a sheet of high permeability material which may then also form the pole piece 140. In such a case, the piezoelectric thin-film may be applied directly to the magnetic substrate, and would also form the gap otherwise formed by the insulating film 150, while a separate insulating film would be applied between the magnetic substrate and the overlying magnetostrictive film to prevent shorting out the piezoelectric film sandwiched therebetween.

FIG. 6 sets forth in perspective view a further preferred embodiment of the present invention wherein a plurality of magnetostrictive-piezoelectric sensing elements are provided, thus enabling simultaneous playback of parallel tracks. Alternatively, such a device may also be used to maintain the head positioned over a single track via a dynamic servoing system. As there set forth, such a head 162 may include a silicon substrate 164 onto which is deposited a metallic electrode 165 and an extended area piezoelectric film 166. As desired, several discrete magnetostrictive films may then be deposited onto the piezoelectric film 166 such as films 168, 170 and 172. Separate contacts may then be provided to the discrete magnetostrictive films via leads 174, 176, and 178, thus coupling each discrete sensor to an appropriate amplifier (not shown). In the device there set forth, it will be recognized that stress, separately induced in any one of the magnetostrictive elements 168, 170, and 172, respectively, will induce a localized strain in that portion of the piezoelectric film proximate the particular stressed magnetostrictive element, thereby providing a localized voltage on one of the leads 174, 176, or 178. While in the embodiment there shown, a single piezoelectric film 166 has been utilized, similarly, separate piezoelectric films matching the magnetostrictive films may likewise be used.

As the three elements function as three discrete heads, the heads may be utilized to playback three separate recorded tracks on a magnetic recording medium 180 positioned adjacent thereto.

Alternatively, if the recorded track is of appropriate width, such as track 182, a servo network may be provided to use the three heads in combination. As so used, the center element formed by the magnetostrictive film 170, in combination with the piezoelectric film 166, forms the primary sensing transducer, while the outer elements monitor the position of the head relative to a recorded track. As long as the head is centered on a track, the two servoing elements will have the same output. If the head starts to drift off the track, one of the servoing elements will have an output different from that of the other two elements, and an error signal generated from the asymmetry in the outputs which can be used to activate a servoing network to recenter the head over the track.

Due to the close proximity of the three elements, a certain amount of "crosstalk" may occur between them, particularly if the magnetostrictive elements produce strain over regions larger than that physically covered by the elements themselves. Consequently, in such an application, a certain amount of mechanical isolation between the respective magnetostrictive elements may be desired.

In the embodiments discussed hereinabove, particularly with respect to FIGS. 1 and 2, it is assumed that the IMP-MOS devices of the present invention are all formed on a common semiconductive substrate. As set forth in FIG. 7, an alternative IMP-MOS device 184 may be formed utilizing a totally passive substrate 188, such as formed of a planar sheet of glass or the like. Onto such a substrate, may then be adhered a conventional MOSFET transistor 190, having the respective doped regions, insulating layers, and metallic contacts, as described hereinabove with respect to the MOSFET portions of the devices 10 and 44 set forth in FIGS. 1 and 2, respectively. Onto an adjacent portion of the substrate 188 may then similarly be adhered a second portion of the device formed of a suitable substrate 192, onto which are deposited a conductive electrode 194 and piezoelectric and magnetostrictive films 196 and 198, respectively. In the embodiment shown in FIG. 7, a separate electrode film 200 may be applied between the piezoelectric film 196 and the magnetostrictive film 198 to enable coupling the electric charge developed across the piezoelectric film. Such an additional layer will be particularly desired if the magnetostrictive film, layer 198, is insufficiently conductive to provide a combined stress-responsive and electrode function. As there set forth, appropriate electrical contact may be provided to the underlying electrode 194 via lead 202, and from the electrode 200 via lead 204 to the gate electrode 206 of the MOSFET transistor 190. Similarly, a suitable source of potential 208 and potential dropping resistor 210 may be provided to couple the drain and source contacts 212 and 214, respectively, of the MOSFET transistor 190. Not shown for purposes of simplicity is an appropriate biasing potential such as may be utilized with the MOSFET 190 in the event it is operated in other than a depletion mode, as is well known to those skilled in the art.

Figure 7:
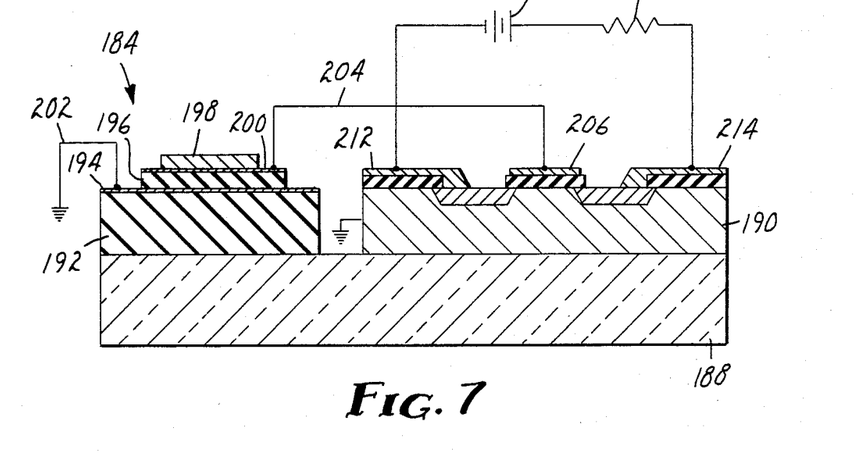
FIG. 7 is a further embodiment of the present invention wherein the magnetostrictive and piezoelectric films are associated with a substrate separate from the substrate on which the MOSFET transistor is formed.

In constructing the device set forth in FIG. 7, a silicon wafer substrate was utilized as the separate substrate 192. A gold film was first sputtered thereon to serve as the lower electrode 194. Next, approximately 1.5 micrometers of zinc oxide was sputtered over the gold layer to form the piezoelectric film. Finally, the ZnO was contact masked, and about a 1 mm×5 mm stripe of magnetostrictive FeSi, about 500 nm thick, was ion beam sputtered onto the ZnO film. The film composition, selected for maximum magnetostriction, was roughly 70% Fe and 30% Si.

In order to obtain a low coercivity, high "squareness", hysteresis loop in the FeSi film, two steps were necessary. First the silicon substrate 192 was tightly coupled to a watercooled stage during deposition. Secondly, a post-deposition annealing operation was performed for about 30 minutes at about 225° C. While it is possible to eliminate the requirement for such an annealing operation if the film is deposited onto a cold substrate, for example, cooled at liquid nitrogen temperatures, unless special care is taken, films so deposited have been known to exhibit inadequate adhesion to the substrates.

Once the FeSi/ZnO structure was formed onto the substrate 192, the sensing element 184 was then cut into a size suitable to be mounted onto the underlying substrate 188.

Figure 8:
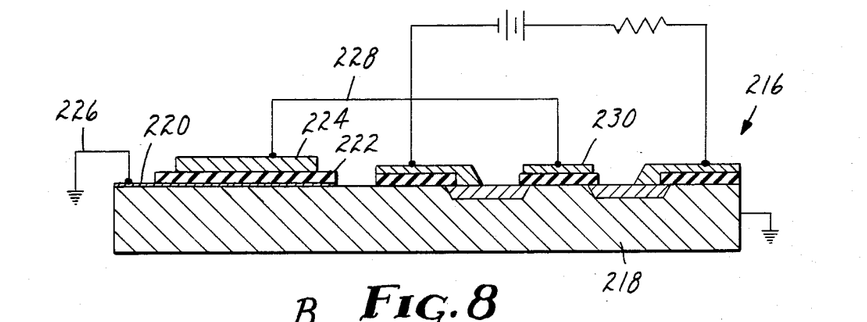
FIG. 8 is a cross-sectional view of a further embodiment of the present invention wherein the magnetostrictive and piezoelectric films are deposited on the same substrate as that used in forming the MOS transistor, but wherein the sensing films are remote from the gate of the MOSFET device.

FIG. 8 sets forth a further alternative embodiment substantially like that of FIG. 7, but wherein a common silicon substrate is provided for both the MOSFET transistor and wherein a separate portion of that substrate is reserved for the separate deposition of the magnetostrictive and piezoelectric films. As is there shown, such a device 216 may include a silicon substrate 218, onto one portion of which is formed a MOSFET transistor as set forth in FIGS. 1, 2 or 7, such a transistor having the associated doped regions, oxide layers, and conductive layers forming the source, gate and drain contacts respectively. On a second portion of the substrate 218 may then be deposited an electrically conductive film 220, a piezoelectric film 222, and a magnetostrictive film 224. In the present embodiment, it is assumed that the magnetostrictive film 224 is sufficiently conductive to provide electrical contact to the piezoelectric film 222 such that no separate electrode layer therebetween is necessary. Accordingly, electrical contacts connecting the magnetostrictive and piezoelectric films to the MOSFET transistor may be provided by a ground lead 226 and via a second lead 228 connecting the magnetostrictive film 224 to the gate electrode 230 of the MOSFET transistor. Appropriate potentials for activating the source and drain, as well as biasing potentials, will be the same as those set forth in FIG. 7.

In certain magnetic sensing situations, a small magnetic signal must be detected in the presence of much stronger noise that is both time varying and/or steady state. A further difficulty is sometimes encountered in that various piezoelectric materials are both pressuresensitive as well as sensitive to other stimuli such as temperature. In addition, non-magnetically induced strains can also couple unwanted signals via the piezoelectric film.

Figure 9:
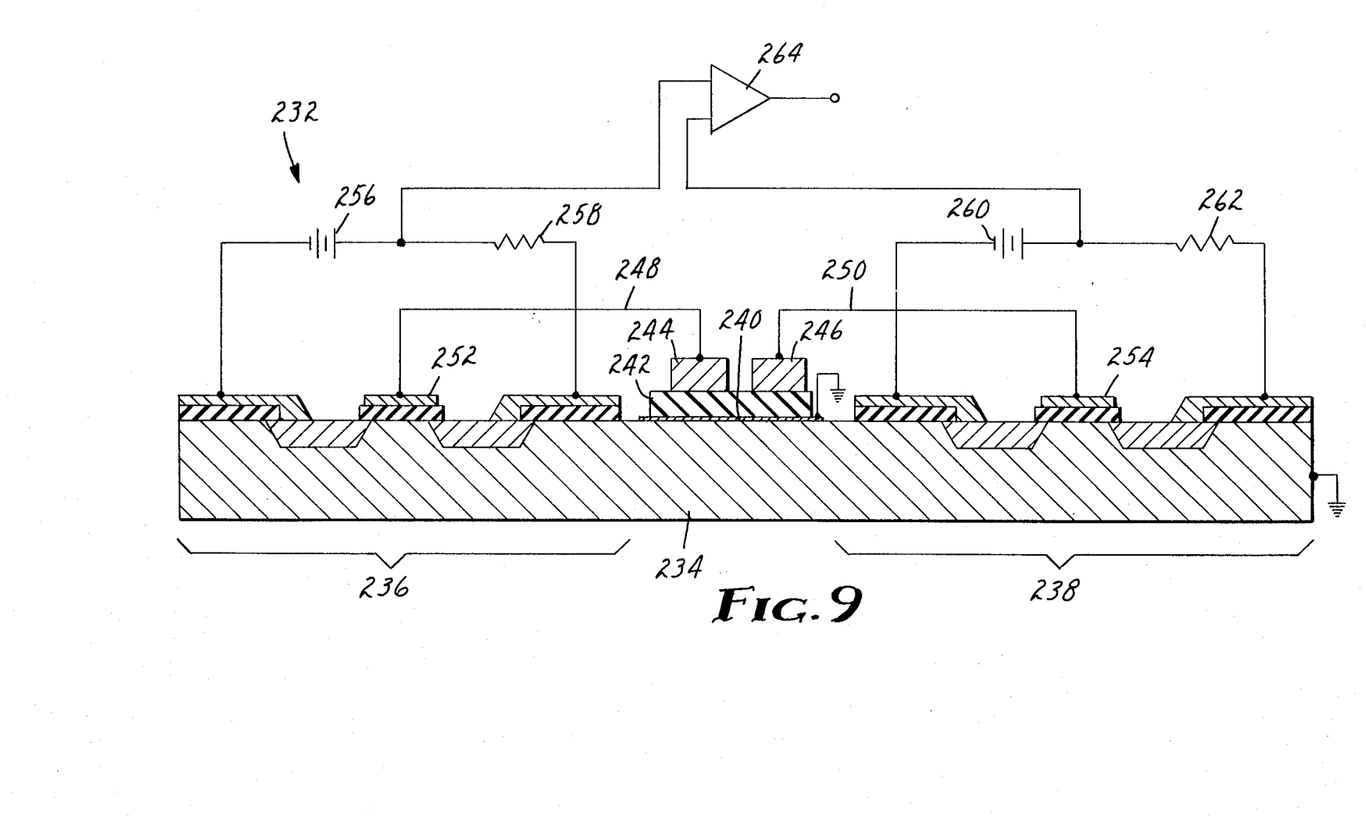
FIG. 9 is a combined cross-sectional view and electrical schematic of a further embodiment of an IMP-MOS device of the present invention incorporating a common piezoelectric film together with a magnetostrictive film and also in conjunction with a nonmagnetostrictive film so as to provide common mode noise rejection.

FIG. 9 sets forth a preferred embodiment of the present invention wherein additional components are provided for suppressing unwanted effects of extraneous stimuli other than that of the main magnetic signals of interest. In such an embodiment, a pair of sensing elements as nearly geometrically identical as possible are provided, with only one of the sensing elements receiving the stimulus of interest, but with both the sensing elements equally receiving all background stimuli. A "bridge" configuration is then often used for devices requiring outside power supplies for operation. For example, FET's, which are voltage variable resistors, would be so configured. The present device being magnetoelectric in nature, does not require an external power supply in order to function, such that a pair of devices will suffice. Accordingly, the device set forth in FIG. 9 incorporates a common mode noise rejection feature. As there shown, the device 232 includes a common substrate 234 within which are fabricated two separate MOSFET transistors each shown generally extending over two separate regions 236 and 238, respectively, of the substrate. Each of the MOSFET transistors would be conventional in nature, having the requisite doped regions, metal oxide layers and source, gate, and drain electrodes, as shown as element 216 in FIG. 8. Further, as shown in FIG. 9, a base electrode 240 may be deposited onto a third region of the substrate and a piezoelectric film 242 deposited thereover. Finally, the common mode noise rejection capability is provided by depositing onto different portions of the piezoelectric film 242 a magnetostrictive film 244 and a similarly configured non-magnetostrictive film 246, such as may be provided from a thin-film aluminum, or the like. Contacts from each of the respective films 244 and 246 are then made via leads 248 and 250 to the respective gate electrodes 252 and 254 of the respective MOSFET transistors. Similar to that shown in FIG. 7 and FIG. 8 hereinabove, appropriate sources of potential and biasing resistors 256 and 258, and 260 and 262, respectively, will also be provided for energization of the two separate MOSFET sections. Similarly, bias supplies will also be provided as appropriate. The output from the two respective MOSFET sections will then typically be coupled to a differential amplifier 264 to provide an appropriate differential output signal. Accordingly, in such a device, a ZnO thin-film such as element 242 would be sputtered onto the conductor 240 and a film of FeSi deposited as the magnetostrictive film 244, while an aluminum film is sputtered as layer 246. The second film 246 is desirably dimensionally identical to that of the magnetostrictive film and should be positioned close to it.

In an alternative embodiment, common mode noise rejection may be obtained even though both the films 244 and 246 are magnetostrictive in nature. In such an embodiment, only one of the films would be exposed to a signal field, with appropriate shielding provided if desired to minimize cross-talk. The transducer then electrically consists of two capacitors sharing a common piezoelectric dielectric and ground electrode. While the two capacitors are electrically identical, only one of which responds to the stimulus of interest. Hence, the difference between the outputs of the two will represent a magnetically induced signal with common mode noise rejected. Similarly, such a structure may also be built with the respective magnetostrictive and non-magnetostrictive films fabricated directly on the gates of the two separate MOSFETs.

Figure 10:
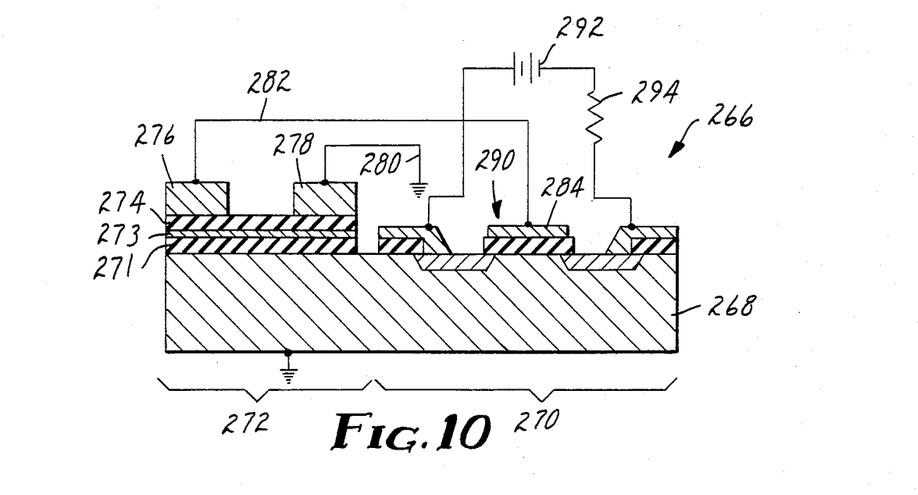
FIG. 10 is a combined cross-sectional view and schematic of a further embodiment of an IMP-MOS device for providing common mode noise rejection utilizing a single transistor.

In an alternative construction, a common mode noise rejection may similarly be achieved using a single MOSFET device. Thus, for example, as shown in FIG. 10, such a device 266 may be fabricated using a single silicon substrate 268 on a first portion 270 of which is fabricated a conventional MOSFET transistor similar to that set forth in regions 236 and 238 in FIG. 9. On the same substrate but within region 272, may then be fabricated overlying films of magnetostrictive and piezoelectric materials as follows: An insulative film 271 may first be applied, over which a common conductive electrode film 273 may be deposited. On top of the conductive film may then be applied a common piezoelectric film 274, such as a sputtered thin-film of zinc oxide. On top of the piezoelectric film may be applied similarly configured magnetostrictive films 276 and non-magnetostrictive films 278, such as a thin-film of aluminum. Assuming the silicon substrate 268 to be grounded, the aluminum film 278 may similarly be grounded via lead 280, while the magnetostrictive film 276 is coupled via lead 282 to the gate electrode 284 of the MOSFET transistor. In such an embodiment, the lower electrode 273 is left floating such that the piezoelectric film essentially forms two capacitors in series, the first capacitor being formed by the piezoelectric film 274 between the aluminum film 278 and the lower electrode 273, and the second capacitor being formed between the electrode 273 and the magnetostrictive film 276.

Figures 11, 14:
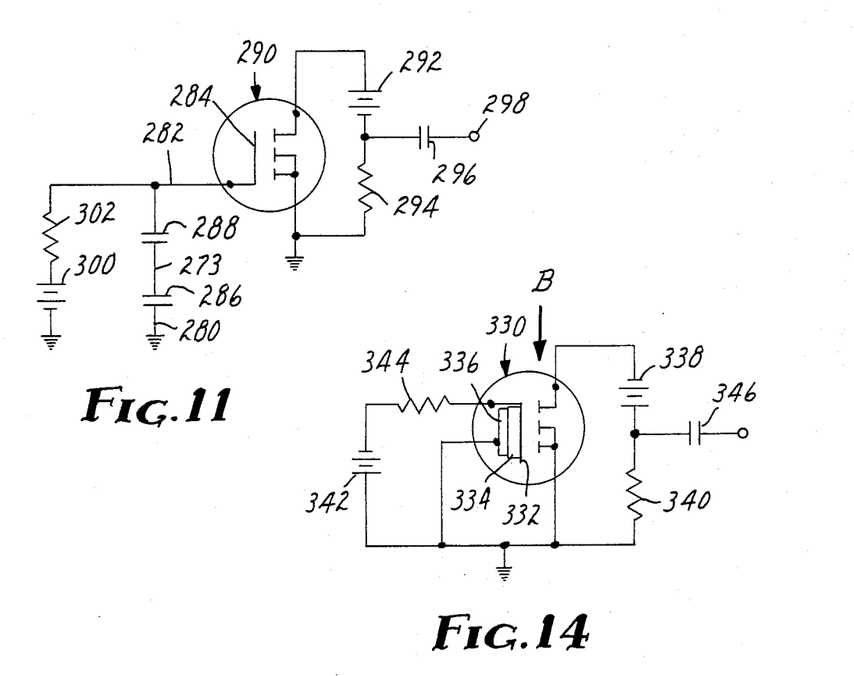
FIG. 11 is a schematic showing the electrical equivalent of the embodiment set forth in FIG. 10 hereinabove.
FIG. 14 is an equivalent electrical circuit showing the appropriate electrical drain and biasing potentials utilized with a P-channel enhancement mode IMP-MOS device.

The equivalent electrical circuit to the embodiment set forth in FIG. 10 is shown in FIG. 11. As there set forth, it may be noted that the first capacitor formed of the aluminum film 278, the piezoelectric film 274, and the underlying electrode 273, is equivalent to capacitor 286; while the second capacitor formed of the electrode 273, the piezoelectric film 274, and the magnetostrictive film 276 is equivalent to capacitor 288 and is connected to the first capacitor 286 via the common electrode 273. The capacitor 288 is coupled via lead 282 to the gate 284 of the MOSFET shown in FIG. 11 generally as element 290. Also shown in FIG. 11 is a source of potential 292, bias and coupling resistor and capacitor 294 and 296, respectively, for providing an output signal at terminal 298. Similarly, an appropriate gate biasing network is shown as potential source 300 and biasing resistor 302.

Figure 12:
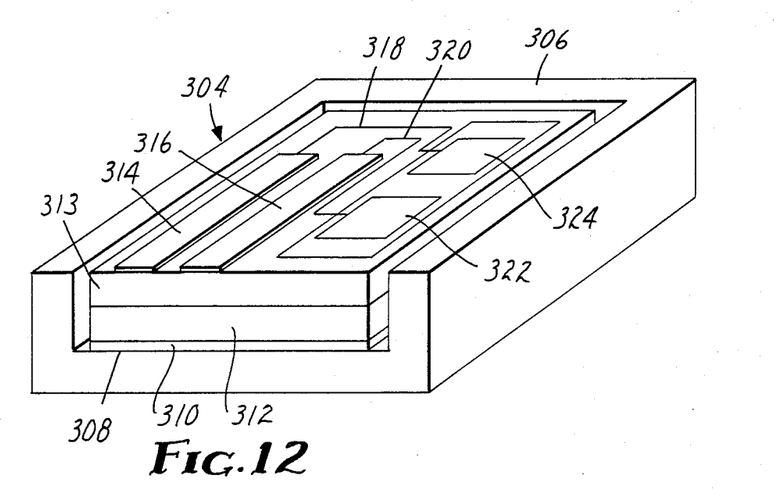
FIG. 12 is a perspective view of an IMP-MOS device of the present invention utilizing both magnetostrictive and non-magnetostrictive films, thereby providing common mode noise rejection such as shown in FIG. 9 wherein the device is assembled in a conventional integrated circuit chip carrier to facilitate further mounting.

A preferred arrangement for mounting the IMP-MOS devices of the present invention is set forth in the perspective view of FIG. 12. As there set forth, one such device 304 may include a conventional ceramic chip carrier 306 which carrier is arranged to have an internal recess and to be open at one end 308. Such chip carriers typically have a plurality of bonding pads positioned about the periphery of the carrier for enabling electrical connections to be made to the various portions of a semiconductor substrate positioned therein. Thus, as set forth in FIG. 12, a silicon substrate 310 may be mounted with an appropriate thermally conductive adhesive within the carrier 306, one end of the substrate terminating substantially parallel with the open end of the carrier 308. Over the entire silicon substrate 310 may be sputtered a thin film 312 of gold approximately 500 nanometers thick. Over the gold film may also be sputtered a piezoelectric thin-film of ZnO 313, ranging between 1.5 and 2 micrometers thick. In order to provide a common mode noise rejection configuration like that set forth in FIG. 9, over the ZnO film may be deposited a magnetostrictive film 314 and a non-magnetostrictive film 316. Preferably, the magnetostrictive film may be a thin-film of an iron-silicon alloy such as $Fe_{72}Si_{28}$, having a thickness of approximately 500 nanometers and a cross-sectional area of approximately $1 \times 5$ millimeters. Similarly, the non-magnetostrictive film 316 may be a sputtered film of aluminum having a thickness of approximately 300 to 500 nanometers, and of similar physical dimensions. As shown schematically by leads 318 and 320, respectively, the magnetostrictive and non-magnetostrictive films 314 and 316 may be coupled to the electrodes of integrated M0SFET transistors 322 and 324. The MOSFETs are bonded to another portion of the zinc oxide piezoelectric film 313 via a suitable thermally conductive adhesive. In a typical case, the periphery of the chip carrier 306 will include bonding pads (not shown) such that connections to appropriate biasing potentials and input and/or output signals may be made to the MOSFETs.

Figure 13:
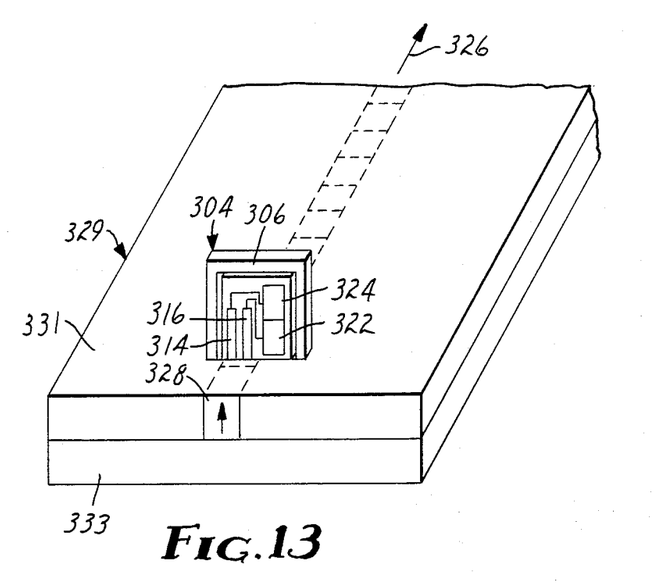
FIG. 13 is a perspective view showing the chip carrier mounted device of FIG. 12 positioned adjacent a magnetic recording medium.

As shown in FIG. 13, such a chip carrier with the respective film terminating proximate the open end of the carrier may be utilized to detect perpendicularly encoded localized magnetic field patterns 328 within a magnetic recording medium 329. Such a medium may include a layer of a vertically oriented magnetic recording material 331 over a high permeability substrate 333, which thereby provides an efficient flux return path. As a localized bit 328 thus comes proximate the magnetostrictive and metallic films 314 and 316, respectively, differential stress will be induced within the magnetostrictive film 314 to provide an appropriate signal from the MOSFETs 322 and 324 as the medium 329 is caused to move in the direction of the arrow 326.

As a further aid in understanding the electrical operation of the IMP-MOS's of the present invention, an electrical equivalent diagram of the device and associated circuit as shown in FIG. 1 and 2 is set forth in FIG. 14. As there set forth, the IMP-MOS device includes a conventional MOSFET transistor 330 on the gate electrode 332 of which has been deposited a piezoelectric film 334 and overlying that film, a magnetostrictive film 336 as discussed hereinabove. For example, such a configuration may include a thin film of $PVF_2$ as the piezoelectric film 334, having a top layer of sputtered elemental nickel. DC voltages are applied to the source and drain from the potential source 338 and resistor 340 while a bias supply is provided by source 342 and bias resistor 344, to bias the MOSFET 330 into the saturation region, and also to provide a reasonable value of conductance. The AC output of the amplifier is taken from the drain resistor 340 through capacitor 346. The value of this drain resistor 340, typically about 10 k-ohms, was selected to give high amplifier gain for a reasonable source-drain supply voltage.

Thus, when the device was placed in an external magnetic field, such as shown by the arrow labeled "B", the field will be seen to induce a stress in the magnetostrictive element 336, thereby inducing an electrical charge in the piezoelectric film 334, which charge is detected at the MOSFET gate 332.

Figure 15:
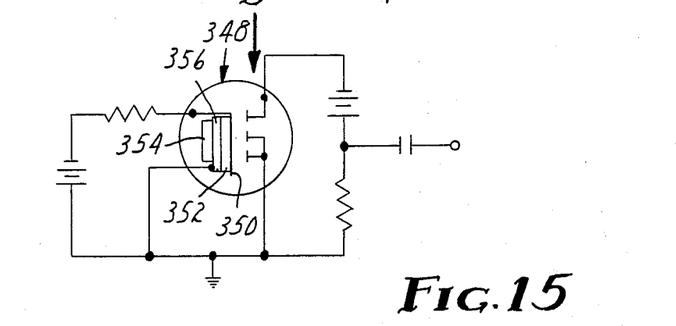
FIG. 15 is an equivalent electrical circuit showing a modified IMP-MOS device together with appropriate drain and bias potentials.

FIG. 15 sets forth a similar electrical equivalent diagram, wherein the IMP-MOS device may be seen to comprise the conventional MOSFET transistor 348 having fabricated on the gate 350 thereof a piezoelectric film 352 formed of a blend of $PVF_2$ and PMMA, and overlying the film 352 a magnetostrictive film 354 formed of an iron-boron alloy. In the embodiment set forth in FIG. 15 it may be further noted that a separate metallic film 356 has been deposited between the piezoelectric film 352 and the magnetostrictive film 354. Such a film is desirable where piezoelectric film 352 is desirably poled in situ as set forth herein.

As described herein, the amplifier which forms an integrated part of the device of the present invention is desirably a MOSFET type transistor and provides the first stage of amplification, as well as impedance matching, to the magnetostrictive-piezoelectric portion of the device. In order to yield the optimum output for the sensor as a whole, the integrated transistor should have a small gate capacitance and a high transconductance. MOSFET type transistors are thus attractive choices for the present application due to their high input impedance and electrical isolation which make it well matched to the magnetostrictive-piezoelectric sensor. However, it should also be noted that alternative amplifier constructions such as JFET's and the like would also be suitable. In any event, the MOS transistors desirably used in the present devices can be fabricated by standard IC processes. Either N-channel or P-channel devices may be used. However, N-channel devices are particularly attractive as they generally yield higher transconductances than do equivalent geometry P-channel type devices. Also, either enhancement or depletion mode devices can be used, depending upon the particular applications intended.

An important consideration for the amplifier of the present invention is that the capacitance at the gate of the transistor be as low as feasible. This desirability results from the nature of the magnetostrictive-piezoelectric transducer which generates a fixed charge which must be distributed over its own capacitance as well as over all parallel capacitances, including that of the MOSFET gate. Minimizing the parallel capacitances results in the maximum output signal.

It is also recognized that various piezoelectric materials may be suitably utilized in the thin-film piezoelectric layer. Among such materials are ZnO, $PVF_2$, CdS, and PZT ceramics. In each case, the piezoelectric thin-film is applied in a manner which results in a high piezoelectric coefficient. Optimum thicknesses and methods of application will depend upon the particular material selected. For example, ZnO and CdS may be sputtered onto the gate of the MOSFET. However, on the other hand, $PVF_2$ may either be glued from a thin sheet form or cast from a solution and poled in situ on the gate of the transistor. An important consideration is that there must be good electrical contact between the piezoelectric material and the gate electrode. Also, for optimum transducer action, the material selected must have high resistivity and good electro-mechanical coupling constant.

Finally, with respect to the magnetostrictive thin-film, such a layer is desirably deposited in intimate contact with the piezoelectric film. As therewith, a number of materials may be used as magnetotrictive elements. Among these are FeSi, FeB, Ni, FeSiTb, FeNi, etc. Again, optimum thicknesses and application techniques will depend upon the particular material selected, there being a variety of techniques available for providing the coupling between the magnetostrictive and piezoelectric films. The magnetostrictive material may be sputtered, evaporated, plated, or even adhered with a thin epoxy layer onto the piezoelectric material. Of course, the mechanical and electrical characteristics of the device will depend on the particular deposition or application method employed.

It is the magnetostrictive film that actually couples to a magnetic field. Consequently, its properties are perhaps the most critical. The basic material characteristics required are relatively low coercivity, so that the film magnetization can be easily switched, and a relatively high magnetostriction coefficient. The particular properties of the magnetostrictive layer can be tailored somewhat to match the properties of the piezoelectric layer and the MOSFET being used. However, in general, it is desirable to have the highest possible induced strain per unit applied field, consistent with achieving magnetic saturation at an acceptably low field intensity. The physical dimensions of the film determine the spatial field resolution and bandwidth of the sensor. Thin film, photolithographically patterned elements will display maximum bandwidth and resolution.

While various specific constructions and circuit configurations have been set forth in conjunction with the figures discussed herein, it will be readily apparent to those skilled in the art that many variations and alternatives are feasible. Thus for example, the various circuit connections, grounds, etc., may be inverted, off-set by suitable D.C. potentials, and equivalent amplifiers and the like provided. Likewise, the various constructional configurations may be inverted, additional films included and alternative pole piece geometries substituted, etc. Also wide variations in the thickness and other dimensions of the respective films utilized in the IMP-MOS device will occur depending upon the specifications desired.

We claim:

1. A thin-film playback head for use with magnetic recording media comprising
(a) a semiconductive substrate having fabricated as an integral part thereof a solid state amplifier having contacts immovably secured thereto and to which appropriate electrical potentials and signals may be coupled,
(b) overlying said substrate, a thin-film of a magnetostrictive material and a thin-film of a piezoelectric material mechanically coupled to said magnetostrictive thin-film, wherein external magnetic fields induce strain in said magnetostrictive thin-film to in turn induce in said piezoelectric thin-film a corresponding electrical polarization and thereby result in a non-equilibrium charge density on at least one surface of said piezoelectric film which is directly proportional to the intensity of the external magnetic field, and
(c) at least two electrodes, each extending over at least a portion of a surface of said piezoelectric thin-film, for coupling an electrical potential corresponding to said charge density from said electrodes to said contacts of said amplifier,
whereby localized magnetic field patterns in a record track on a magnetic recording medium positioned adjacent said magnetostrictive thin-film may be directly sensed independently of the speed or changes in the speed at which the head is moved relative to the medium, as the stress induced in said magnetostrictive thin-film due to such field patterns is coupled to said piezoelectric thin-film and resuls in said polarization and non-equilibrium charge density, and the corresponding potential coupled to said amplifier results in an output signal from said amplifier which is directly representative of said localized field patterns and which has low impedance, low noise characteristics, in contrast to the high impedance signal associated with the non-equilibrium charge density.

2. A playback head according to claim 1, wherein said magnetostrictive thin-film is applied over said piezoelectric thin-film and exhibits appreciable electrical conductivity, thus also providing one of said electrodes extending over one surface of said piezoelectric thin-film.

3. A playback head according to claim 1, comprising a semiconductive substrate,
a solid state amplifier forming an integral portion of a section of said semiconductive substrate,
a metallic thin-film conductor applied to another portion of said substrate,
a piezoelectric thin-film deposited on said thin-film conductor,
a magnetostrictive thin-film deposited on said piezoelectric thin-film and having appreciable electrical conductance, thereby both responding to magnetically induced stress and providing electrical contact to said piezoelectric film, and
electrical connections between said metallic thin-film conductor and said magnetostrictive thin-film and inputs to said amplifier.

4. A head according to claim 3, further comprising at least a one turn inductive thin-film winding encompassing at least one of said pole pieces, thereby allowing write currents to be applied to said winding to generate magnetic fields proximate to said working gap sufficient to record corresponding field patterns onto a magnetic record medium positioned proximate thereto.

5. A playback head according to claim 1, wherein said solid state amplifier comprises at least one input contact on the surface of said semiconductive substrate, and wherein said piezoelectric thin-film is applied directly thereto, one of said electrodes thereby being formed by said input contact.

6. A playback head according to claim 1, wherein said solid state amplifier comprises a MOSFET type amplifier having a gate to which an electrical contact is affixed.

7. A playback head according to claim 6, wherein said piezoelectric thin-film is fabricated directly onto said gate contact.

8. A head according to claim 1, further comprising a plurality of magnetostrictive thin-films overlying at least one piezoelectric thin-film, with strain magnetically induced in a given magnetostrictive thin-film thereby being coupled to a piezoelectric film adjacent thereto to result in a corresponding electrical polarization and non-equilibrium charge density in said adjacent piezoelectric film such that multiple parallel tracks on a record medium may thereby by detected, and/or said head may be dynamically centered on a single track of sufficient width to encompass at least three magnetostrictive films, and any deviation of the head being detectable as a change in the balance of signals detected by the outermost magnetostrictive films to thereby activate a transverse head position servo mechanism.

9. A playback head according to claim 1, wherein said head further comprises a chip carrier for supporting said substrate and thin-films thereon and being open at one end, with at least two substantially co-planar pole pieces comprising thin-films of high permeability material supported by said carrier and having mutual boundaries defining a working gap and a back gap and terminating substantially coplanar with said open end such that the plane of said thin-film pole pieces may be mounted substantially normal to the plane of a magnetic recording medium to have said working gap extending parallel to the surface of said medium, thereby enabling magnetic fields associated with localized patterns on said medium to be coupled via said working gap to said pole pieces, and wherein said magnetostrictive thin-film is positioned within said carrier and substantially across said back gap defined by said pole pieces to thereby impress said coupled magnetic fields onto said magnetostrictive thin-film.

10. A playback head according to claim 1 further comprising at least one insulating thin-film adjacent to at least one surface of said piezoelectric thin-film for maintaining charge separation on the surfaces of said piezoelectric thin-film.

11. A playback head according to claim 1 wherein said piezoelectric thin-film comprises a material selected from the group consisting of zinc oxide, cadmium sulfide, and polyvinylidene fluoride.

12. A playback head according to claim 1 wherein said magnetostrictive thin-film comprises a material selected from the group consisting of nickel or alloys of iron with nickel, boron, silicon and terbium.

13. A playback head according to claim 1, wherein said head further comprises a chip carrier having an internal recess for supporting said substrate and thin-films thereon, said carrier being open at one end and having said substrate and said magnetostrictive thin-film terminating substantially co-planar with said open end, and wherein said carrier and elements supported therein are adapted to be mounted with the plane of said thin-films substantially normal to the surface of a magnetic recording medium, thereby enabling localized magnetic patterns on said medium and oriented normal to the surface thereof to be impressed on the length of the magnetostrictive thin-film extending away from said recording medium surface to thereby impart a lengthwise stress which is coupled to said piezoelectric thin-film.

14. A playback head according to claim 1, wherein said head further comprises a chip carrier for supporting said substrate and thin-films thereon and being open at one end, incorporating at least one pole piece comprising a thin-film of a high permeability material supported by said carrier and terminating substantially coplanar with said open end such that the plane of said pole piece may be mounted substantially normal to the plane of a magnetic recording medium, thereby enabling magnetic fields associated with localized magnetic patterns on said medium to be coupled to said pole piece, and wherein said magnetostrictive thin-film is positioned within said carrier overlapping said pole piece to thereby impress said coupled magnetic fields onto said magnetostrictive thin-film.

15. A playback head according to claim 14, wherein said pole piece terminates within said carrier to define one boundary of a back gap, and wherein a second thin-film of a high permeability material of appreciably larger area is supported by said carrier, one portion of which terminates within said carrier to define another boundary of said back gap and a second portion having an extended width terminates substantially coplanar with said open end to distribute said coupled magnetic fields back to said medium.

16. A head according to claim 14, further comprising at least one turn inductive thin-film winding encompassing said pole piece, thereby allowing write currents to be applied to said winding to generate magnetic fields proximate to said pole piece sufficient to record corresponding field patterns onto a magnetic record medium positioned proximate thereto.

* * * * *

UNITED STATES PATENT AND TRADEMARK OFFICE
CERTIFICATE OF CORRECTION

PATENT NO. : 4,520,413

DATED : May 28, 1985

INVENTOR(S) : Steven A. Bendson and William M. Mularie

It is certified that error appears in the above-identified patent and that said Letters Patent is hereby corrected as shown below:

The inventors under No. 75 on the frontpiece should read --Steven A. Bendson and William M. Mularie--.

Col. 8, line 39, "therby" should read --thereby--.

Col. 14, line 65, "magnetotrictive" should read --magnetostrictive--.

Col. 15, line 64, "positoned" should read --positioned--.

Col. 16, line 2, "resuls" should read --results--.

Col. 16, line 32, "3" should read --9--.

Signed and Sealed this

Fifteenth Day of October 1985

[SEAL]

Attest:

DONALD J. QUIGG

Attesting Officer

Commissioner of Patents and Trademarks—Designate